April 11, 1967  W. LIMBERGER  3,313,913
ELECTRICALLY HEATED MACHINE FOR PRODUCING PHOTOGRAPHIC COPIES
Filed March 5, 1962  3 Sheets-Sheet 1

INVENTOR:
Walter Limberger
by Singer, Stern & Carlberg
Attorneys.

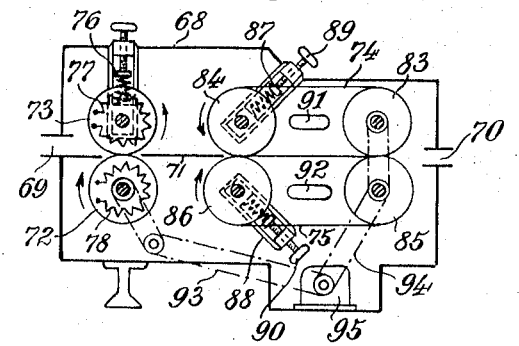
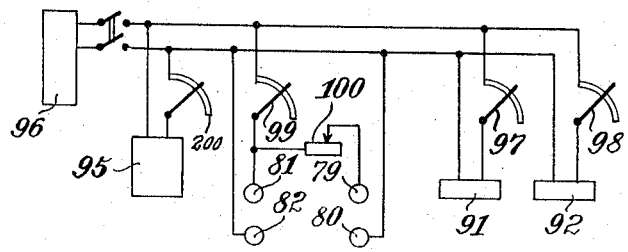
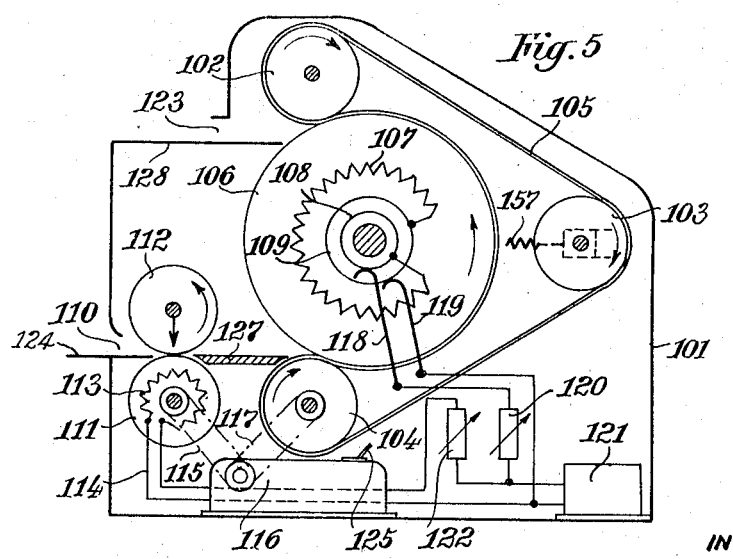

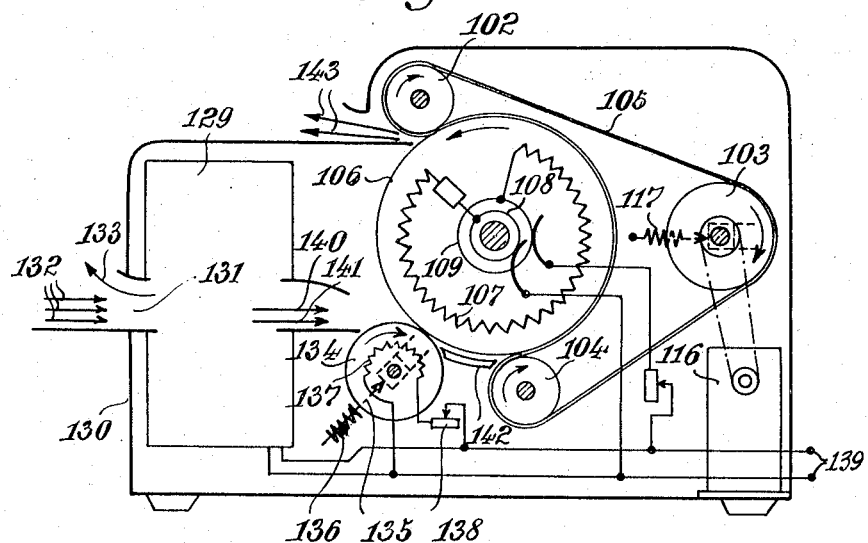

United States Patent Office 3,313,913
Patented Apr. 11, 1967

3,313,913
ELECTRICALLY HEATED MACHINE FOR PRO-
DUCING PHOTOGRAPHIC COPIES
Walter Limberger, Hamburg-Poppenbuttel, Germany, as-
signor to Lumoprint Zindler K.G., Hamburg, Germany
Filed Mar. 5, 1962, Ser. No. 177,648
Claims priority, application Germany, Mar. 6, 1961,
L 38,372
6 Claims. (Cl. 219—216)

The invention relates to a process for the production of diffusion copies by the application of heat, heat being applied to a negative after exposure for effecting development and if required fixing.

The invention further relates to a device for carrying out this process.

Films provided for a diffusion process which can be treated by the application of heat are already known or are proposed in a particular arrangement. The type of heat application is not disclosed in more detail since these films were previously treated only in laboratory experiments in which development is effected for example by surface pressing using a flat-iron type heating device.

The invention is based on the problem of providing a method for the production of diffusion copies which enables the films provided therefor to be put to practical use, a heat application being provided on one hand which is particularly advantageous for the treatment of such films and, on the other hand, the treatment of such films during passage through an apparatus being made possible.

It is pointed out that, for effecting a heat development in diffusion processes, it is known to arrange several films on a backing or to arrange separate films, for example a negative film and a print film, upon separate backings.

According to the invention the negative, in contact with a print film, is subjected to at least one progressive line pressing with the simultaneous application of heat, and subsequently, while the materials are maintained under opposed pressure less than the line pressing, further heat is applied for a reduced period.

The line pressing which takes place with the greater application of heat rises, in an advantageous manner, above a threshold limit for effecting development and/or fixing, which is then continued and finished in the subsequent treatment step of opposed pressing accompanied by the application of heat.

It has been found that for a heat development or diffusion materials an arrangement is advantageous which is unexpected on the ground of the known moistening process since in the moistening process a so-called wetting and transport roller pair at the end of the guide path is arranged through the developer liquid.

The application of heat in the line pressing, which can for example be effected by two heater rollers, is advantageously effected by heating the rollers to 60 to 120° C., and advantageously in the range of 90 to 120° C. The temperature selected can, under certain circumstances, be higher. It depends on the materials treated, whereby it is to be noted that the heat must pass through at least one backing, and if necessary also to a cover sheet or a cover layer, before it comes into effect in the films. Furthermore, the heat can be higher according to the device used, when for example transport belts are guided around heater rollers, which belts effect a reduced pressing on the backing or the layers behind the line pressing with simultaneous application of heat.

The line pressing is effected using rollers, for example when treating a regular size business stationery in the longitudinal direction by an opposed pressing of the rollers, which for example have diameters of 4 to 5 cms., to an amount of 3 to 6 kgs. In general it can be stated that along the pressline a pressure in the range 0.5 to 1.5 kilograms per centimeter can with advantage be used, the preferred range lying in the order of magnitude of 0.9 to 1.1 kilograms per centimeter.

The period of the opposed pressing subsequent to the line pressing is advantageously 3 to 20 seconds and advantageously lies in the lowermost part of this range, for example at about 5 seconds.

The temperature which is applied during this period is the same or less than that during the line pressing. It is pointed out that the preceding pressure and temperature values do not limit the invention to a fixed value since they depend on the materials used and also on their relative proportions, since at a higher pressure a lower temperature can for example be used. In particular, it is also foreseen that after the line pressing a gradually changing temperature and/or pressure effect occurs without, however, the omission of the characterising step of line pressing.

The heating in the subsequent treatment zone can occur in any manner by heated flat or curved surfaces, belts or other transport means or if required by radiators, in which the opposed pressing in the subsequent treatment zone is effected by an adhesion brought about by the line pressing.

In one particular embodiment, a further treatment step comprises in that the films, after the heat treatment in the subsequent treatment zone, are subjected to a further line pressing of the same or less strength than the initial line pressing. This second line pressing has the purpose of enuring the fullest possible use of the substances in the film, whereby according to the type of previously selected heat treatment the second line pressing can occur without the application of heat.

Under the preceding conditions, several line pressings, for example with different strengths, can be carried out with simultaneous application of heat, whereby after each line pressing heat is applied within a predetermined period, a reduced pressing of the materials being maintained, advantageously in two or three of such line pressings provided one after the other.

According to an advantageous embodiment of the invention, a negative film and a print film are used in separate backings and, after treatment according to the above process, are separated from each other. In this case materials can be included with which a development and/or fixing takes place, whereby the production of the copy can occur by the silver salt diffusion process or a developer diffusion or the like in which a substance passing from one film into another effects a reaction. The films have in the known manner film pictures and if necessary further substances for providing water of crystallisation.

In a particular embodiment, the invention includes the treatment of a material in which several films are provided on one backing and the diffusion takes place between the films on this backing. The reaction films can thus be separated by intermediate films which respond to heat and/or pressure, or reaction films which respond to heat and/or pressure can be provided one immediately on the other. Furthermore, it is possible to use a material from which a layer is releasable after the treatment has been carried out.

A particular feature in the use of a multiple material on a backing comprises in that the method is carried out with simultaneous application of a film comprising, for example, paper or plastics material, which is advantageously impermeable to liquids and if required is absorbent on one side, in order to reduce the separation of substances from the films or, in types which are impermeable to liquids on one side, to effect an adhesion to a sheet film is to be removed after the treatment and thereby to facilitate the subsequent separation.

The device according to the invention, which has means for carrying out the method, comprises a first roller pair for producing the line pressing. Of this roller pair, at least one roller is heated, or this roller pair is located in a heated environment. For maintaining a pressure of the materials less than the line pressing, stationary heating devices, for example with pressure pads or further roller pairs, can be used which run against each other with a lower pressure than the first roller pair.

It is possible to provide a belt section in which two tensioned transport belts run on each other under elastic pressure, the heating effect being applied through the transport bands.

A particularly preferred embodiment includes a heating section on a drum around which the material is guided by means of one or more bands with elastic pressure. In this case, the first roller pair can be arranged preceding or can also for example be formed partly by the drum, an elastically pressed roller being arranged before the belt guide section. Further advantages and features of the invention will be evident from the following description of the exemplary embodiments schematically illustrated in the drawings, in which:

FIGURE 3 shows a schematic side view of another embodiment of the invention;

FIGURE 4 shows a circuit diagram of the embodiment according to FIGURE 3;

FIGURE 5 shows a schematic side view taken in section of a further embodiment, and FIG. 6 shows a view similar to FIG. 5 and relating to still another embodiment of the invention.

Figure 1:
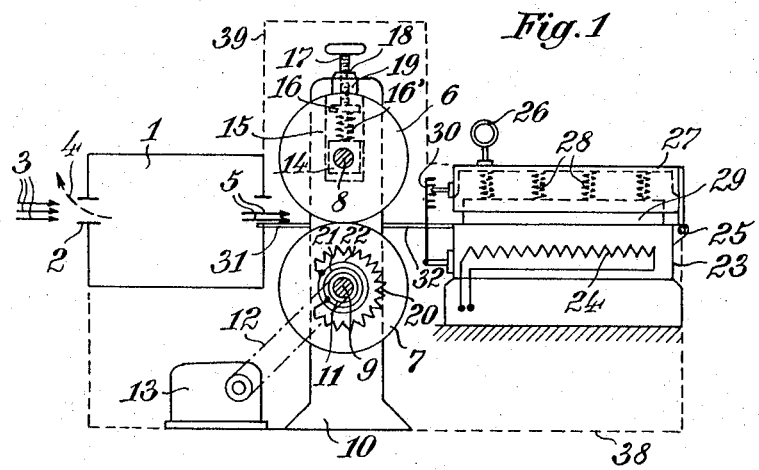
FIGURE 1 shows a side view of a device according to the invention, a part of the roller support being omitted and several parts being only schematically illustrated.

In FIGURE 1, an exposure device is arranged in an assembly 1, which exposure device includes a separating device. In an inlet slot 2 in this exposure device three sheets of material are inserted as indicated by the arrows 3, one of which is the original, which after exposure is returned as indicated by arrow 4 to the inlet slot arrangement 2, while the two copy materials are guided as indicated by the arrows 5 through the outlet slot arrangement of a heater roller pair comprising rollers 6, 7. The rollers 6, 7 are journalled by means of shafts 8, 9 in a roller support, of which only the rear part 10 is shown, the front part being omitted for the sake of clarity. The ends of the shaft line are journalled in a known manner in the roller support. One shaft end carried for instance a drive disc 11 and is connected by transmission means 12 to a drive motor unit 13. The shaft 8 of the other roller is rotatably supported in movable bearing blocks 14. The bearing blocks are movably guided in respective slots 15 in the direction of the roller 7. At the upper side of each block 14 there is a compression spring 15, the other side of which is supported on a plate 16. This plate can be adjusted by a tension screw 17 which is guided by a threaded opening 18 through the upper bridge member 19 which closes the top of the slots 15. By this means, the pressure between the rollers 7 and 8 can be adjusted.

It is possible, in a manner which is clearly obvious to the expert, to drive the upper roller 6 in synchronism with the lower roller, for example by means of a belt between the shafts 8 and 9.

According to the arrangement illustrated, at least the lower roller is hollow and is equipped with a heating element 20 for heating. The ends of the heating elements are connected to slip rings 21, 22. It is to be understood that a corresponding heating element can also be arranged in the upper roller 6.

To the right of the arrangement of the rollers 6, 7 there is provided a stationary heating device comprising a box-like lower part 23 with a heater element 24. To this heater element there is connected, by means of a hinge 25, a pressure lid 27 which is to be actuated manually, for example by means of a handle 26, and which has a pressure pad, elastically supported for example on a spring 28, which can be pressed against the upper heated surface of the lower part 23. It is possible to arrange adjustable regulating means 30 between the lid and the lower part. Between the assembly 1 and the gap between the rollers there extends a transport means 31 constructed for example as a table. A corresponding transport means 32 leads to the arrangement 23, 27.

Figure 2:
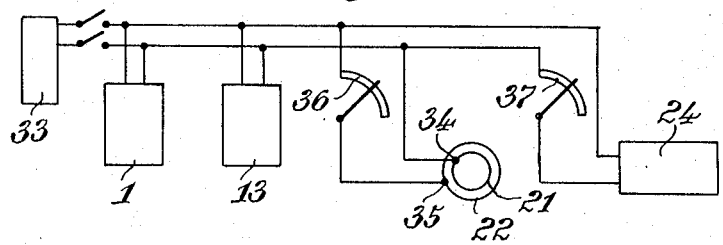
FIGURE 2 shows a circuit diagram for FIGURE 1.

The connections of the elements are obvious without further description from FIGURE 2, in which the energy source is indicated by 33. It can be seen that brushes 34, 35 slide on the slip rings 21, 22. Adjustable resistors 36, 37 are connected before both the heating element 20 and the heating element 24.

The exposed copy materials leaving the assembly 1 as indicated by the arrow 5, pass between the rollers 6, 7, whereby according to the adjustment of the pressure screw 17 and the resistor 33 a predetermined line pressing at a predetermined temperature is applied. Simultaneously the lid 27 is held open by means of the handle 26, so that the material sheets pass onto the heating plate of the lower part 24. They can be removed therefrom by hand. The lid is then pressed and further heat applied. By adjustment, for example, of the spring 28 and if required in association with the abutment for the greatest possible pressure of the lid 27, it is ensured that this pressure does not exceed a certain amount.

It can be seen that the rollers 6, 7 and the upper part of the device can be arranged within a housing such as is indicated by the broken lines 38, 39.

The apparatus according to FIGURE 3 comprises, in a housing 68 between an inlet slot 69 and outlet slot 70, a transport section with guide elements 71, in which there are provided a roller pair with heated rollers 72, 73 and a pressing section having two endless belts 74, 75 which run against one another at the height of the transport section.

The rollers 72, 73 are supported in the manner described with reference to FIGURE 1, so a more detailed description is unnecessary. The adjustment assembly with the pressure screw for the roller 73 is indicated by 76. Both rollers 72, 73 have respective heater elements 77, 78 the leads of which extend to slip rings 79, 80 and 81, 82 respectively (FIGURE 4). These slip rings are disposed on the rollers as has been described with reference to roller 7.

The belts 74, 75 are respectively guided over two roller pairs 83, 84 and 85, 86, of which the rollers 83, 85 can be supported substantially stationary in the side walls of the housing, while the rollers 84, 86 are supported movable in one direction, each with an assembly 87, 88 corresponding to the assembly 76 and having respective pressure screws 89, 90, so that on shifting the pressure between the belts 74, 75 is increased and also the tensioning of these belts is effected. The rollers 83, 85 can for example have soft elastic coverings so that a predetermined pressure can be obtained between them.

Within the endless transport belts 74, 75 there are arranged respective heat sources, advantageously infra-red radiators 91, 92 directed towards the transport section.

From a motor drive unit 95 the roller 72 is driven via a transmission 93 and the rollers 83, 85 via a transmission 94. The arrows show the directions of rotation. From the circuit shown in FIGURE 4, in which the energy source is indicated by 96, it can be seen that the heat radiators 91, 92 are separately adjustable by means of resistors 97, 98. The heater elements 77, 78 are adjustable by a common resistor 99, while in addition the heater element 77, which is for example connected to the slip rings 79, 80, has a further special adjustable resistor 100.

Another embodiment of the apparatus is shown in FIGURE 5. In the side walls of a housing 101 three rollers 102, 103, 104 are rotatably supported in a known manner. Over these rollers are guided one or more endless belts 105, which guide and tension a hollow cylinder 6 of heat conductive material arranged partly between the rollers 102, 104, and partly against the belts, as is for example known in exposure devices. In the cylinder 106 there is included a heater element 107 the ends of which extend to slip rings 108, 109.

Approximately at the height of the nip between the roller 104 and the cylinder 106, there is provided an inlet opening 110 in the housing. Between this inlet opening and the group comprising the cylinder 106 and the roller 104 there is arranged a roller pair with rollers 111, 112, which correspond in construction, support and adjustability to the rollers 6, 7 in FIGURE 1, i.e., the roller 111 is driven in the direction of the arrows shown and the roller 112 rotates in the direction of the arrows shown and is pressed elastically against roller 111 corresponding to the arrow directed vertically downwards. In the roller 111, there is for example provided a heater element 113, which is connected via slip rings with the lead 114. The drive of the roller 111 is effected via a transmission 115 from a motor unit 116, which also for example drives the roller 104 via a transmission 117.

For adjusting the tension of the belts 105 the roller 103 can for example be supported movable as indicated by the arrow 117, for which purpose there can serve an assembly arranged to act in the direction of the arrow 117, such as is for example provided for supporting the roller 6 in the vertical direction.

The slip rings 108, 109 are connected by means of brushes 118, 119 and via an adjustable resistor 120 to a power source 121. In addition, an adjustable resistor 122 is provided in the lead 114 for the heater element 113.

The housing has an outlet opening 123 at the height of the apparatus between the roller 102 and the cylinder 106.

The copy materials inserted through the inlet opening 110 receive their progressive line pressing with equal application of heat between the rollers 111 and 112. They are then guided by guide or transport means 124 to the heating section on the cylinder 106, where a predetermined pressure by the belts 105 is maintained. The duration of the heating effect depends on one hand on the circumference of the cylinder 106, which is chosen relatively large, and on the other hand on the drive speed. On these grounds it is a special feature of the invention that the drive motor unit 116 includes a gear train which is adjustable so that the passage time is variable. As adjustment means there is provided the lever 125. The motor drive unit 95 (FIGURES 3, 4) is correspondingly adjustable. The resistor 200 in the motor supply lead serves for adjustment of the speed of rotation.

The copy materials passing around the cylinder 106 separate in the neighbourhood of the outlet opening 123 from the periphery of the cylinder and are guided out through the outlet opening 123 by means of the outlet surface 128.

FIGURE 6 shows a variation of the embodiment according to FIGURE 5, in which corresponding parts are indicated by the same reference numerals and are, therefore, not described.

In this embodiment there is included in the housing 130 an assembly 129 corresponding to the assembly 1 shown in FIGURE 1, to which not only two copy materials but also the original are guided through the inlet opening 131 as indicated by the three arrows 132, the original being further guided in the assembly 129 after exposure as indicated by the arrow 133. Furthermore, in this embodiment the first progressive line pressing is carried out between the roller 134 and the cylinder 106, since this roller is elastically pressed, as indicated by the arrow 135, against the cylinder 106 by means of a tension spring 136.

For the opposed pressing there can serve a support device such as that described with reference to FIGURE 1 for the roller 6. In the roller 104 there is provided a heater 137 which is connected to the power supply 139 by slip rings (not shown) and a resistor 138.

The exposed copy materials lying one upon the other, are guided as indicated by arrows 140, 141, between the roller 134 and the cylinder 106, so that a progressive line pressing is here obtained which on one hand by adjustment of the tension devices 136, 117 is stronger than the pressing by means of the belts 105 and the cylinder 106, and on the other hand because of the comparatively small radius of the roller 134. The materials are then guided by guide means 142 for further heat application with a smaller superficial pressing to the section at which the transport belts 105 lie under tension against the periphery of the cylinder. After passage through this section the copy materials are ejected as indicated by the arrows 143. The roller 134 can be rotated by its abutment with the cylinder or can have a separate drive by the arrangement of a transmission between the motor unit 116 and the roller 134.

I claim:

1. In a machine for producing photographic copies by applying heat to an exposed negative and a print film containing the required development and diffusion substances in a form releasable through heat, a pair of rollers, means rotatably supporting said rollers in parallel inter-relation, means for driving at least one of said rollers, adjustable means resiliently biasing one of said rollers towards line contact with the other roller, heating means for at least one of said rollers, and non-chemical pressure means at the exit side of the nip between said pair of rollers for resiliently pressing said films against each other, the improvement comprising means for heating said pressure means, and means for adjusting the pressure exerted on the films in said pressure means to a value below that between said pair of rollers, said pressure means having extended surface contact with each other.

2. The machine set forth in claim 1, including separate adjustment means for at least one of said heating means.

3. The machine set forth in claim 1, in which said pressure means includes a film support plate containing said last mentioned heating means, a lid hingedly connected to said support plate, a pressure pad within said lid superposed upon said support plate in closed condition of said lid, resilient means between said lid and pad biasing said pad towards said support plate, and guide means for the films between said nip and said support plate.

4. The machine set forth in claim 1, in which said pressure means comprises two endless belts, a housing enclosing said belts and said pair of rollers, a guide roller and a tension roller for each of said endless belts, said guide rollers and tension rollers being rotatably mounted in said housing so as to maintain bights of said belts in engagement with each other at the exit side of the nip between said pair of rollers, means for driving said guide rollers, heat sources adjacent to said engaging bights, means for regulating the intensity of said heat sources, guide means for the films between said nip and said bights, and means associated with said tension rollers for adjusting the engagement pressure between said bights.

5. The machine set forth in claim 1, including a housing with inlet and outlet openings for the films, and in which said pressure means comprises a cylinder rotatably mounted in said housing, adjustable means for heating said cylinder, an endless belt, guide rollers for said endless belt so arranged as to maintain a bight of said belt in adjustable pressure engagement with a portion of the circumference of said cylinder, film guide means at the exit side of said nip between said first mentioned pair of rollers and extending to the vicinity of the entrance end of the engagement portion of said belt with said cylinder, and means for driving said cylinder and said belt in synchronism with said pair of rollers.

6. The machine set forth in claim 5, in which said cylinder also constitutes one of the rollers in said pair of rollers.

References Cited by the Examiner

UNITED STATES PATENTS

| | | | |
|---|---|---|---|
| 2,556,008 | 6/1951 | Spalding | 219—469 X |
| 2,918,857 | 12/1959 | Frantz | 95—77.5 |
| 2,971,840 | 2/1961 | Haydn | 96—29 |
| 2,983,210 | 5/1961 | Baril. | |
| 2,986,987 | 6/1961 | Limberger | 95—77.5 |
| 3,038,994 | 6/1962 | Nelson et al. | 250—65.1 |
| 3,043,691 | 7/1962 | Weyde | 96—29 |
| 3,142,241 | 7/1964 | Limberger | 95—89 |
| 3,207,896 | 9/1965 | Meaney | 250—65 |

ANTHONY BARTIS, *Primary Examiner.*

RICHARD M. WOOD, N. G. TORCHIN, *Examiners.*

JOHN M. HORAN, G. H. BJORGE, C. L. ALBRITTON, *Assistant Examiners.*